United States Patent [19]

Siemon et al.

[11] Patent Number: 5,035,645
[45] Date of Patent: Jul. 30, 1991

[54] BRACKET FOR TERMINAL BLOCK

[75] Inventors: John A. Siemon, Watertown, Conn.;
Paul V De Luca, Plandome Manor, N.Y.

[73] Assignee: The Siemon Company, Watertown, Conn.

[21] Appl. No.: 380,123

[22] Filed: Jul. 14, 1989

Related U.S. Application Data

[63] Continuation-in-part of Ser. No. 330,678, Mar. 30, 1989, abandoned, which is a continuation-in-part of Ser. No. 144,040, Jan. 15, 1988, Pat. No. 4,824,403.

[51] Int. Cl.$^5$ .............................................. H01R 9/22
[52] U.S. Cl. .............................. 439/532; 174/72 A; 248/74.3; 439/719
[58] Field of Search ............... 439/532, 709, 716, 719, 439/49; 174/72 A, 60; 361/426, 427, 428; 379/325–330; 248/74.3

[56] References Cited

U.S. PATENT DOCUMENTS

| | | |
|---|---|---|
| 1,639,310 | 8/1927 | Richardson ........................... 439/719 |
| 2,327,326 | 8/1943 | Churchill ............................. 248/74.3 |
| 3,506,947 | 4/1970 | Leskosek ............................. 439/532 |
| 3,772,223 | 12/1973 | Chandler et al. ................. 174/72 A |
| 3,810,596 | 5/1974 | Elm ..................................... 248/74.3 |
| 4,072,379 | 2/1978 | Towne et al. ......................... 439/61 |
| 4,150,867 | 4/1979 | Knickerbocker ................. 174/72 A |
| 4,230,387 | 10/1980 | Zahn ..................................... 439/357 |
| 4,553,801 | 11/1985 | Zajeski ................................ 439/595 |
| 4,669,799 | 6/1987 | Vachhani et al. ................... 439/719 |
| 4,712,232 | 12/1987 | Rodgers .............................. 174/60 |
| 4,729,064 | 3/1988 | Singer, Jr. ........................... 439/716 |
| 4,773,867 | 9/1988 | Keller et al. ....................... 379/325 |
| 4,796,289 | 1/1989 | Masor ................................. 361/426 |
| 4,824,403 | 4/1989 | DeLuca et al. ..................... 439/714 |

FOREIGN PATENT DOCUMENTS 881847 11/1961 United Kingdom ................ 174/101

Primary Examiner—Neil Abrams
Attorney, Agent, or Firm—Fishman, Dionne & Cantor

[57] ABSTRACT

A new and improved bracket or cradle for use in conjunction with terminal blocks for effecting connections in the telephonic, data transmisison and related fields is presented. In accordance with the present invention, the cradle comprises a generally rectangular bracket having a rear face and two opposed side faces transverse to the rear face. Each of the three faces include openings therein for receiving conventional male or female connector elements. In accordance with an important feature of the present invention, the longitudinal upper surfaces of the opposed faces each include a plurality of wire guide openings for positioning and retaining wires; and providing improved wire management to the bracket. Each wire guide opening is defined by a pair of spaced, alternating substantially T-shaped and longitudinal extensions which are positioned along the longitudinal upper surfaces to define an array of teeth. Another important feature of the cradle of the present invention is the provision of cable tie down located on the rear surface of the bracket. This cable tie down feature permits a cable which is run through the bracket to be tightly secured subsequent to installation. Still another important feature of the present invention is an improved snap-on attachment for effecting more reliable and secure attachment to a terminal block. This snap-on attachment is positioned along the upper surfaces of the opposed side faces.

24 Claims, 4 Drawing Sheets

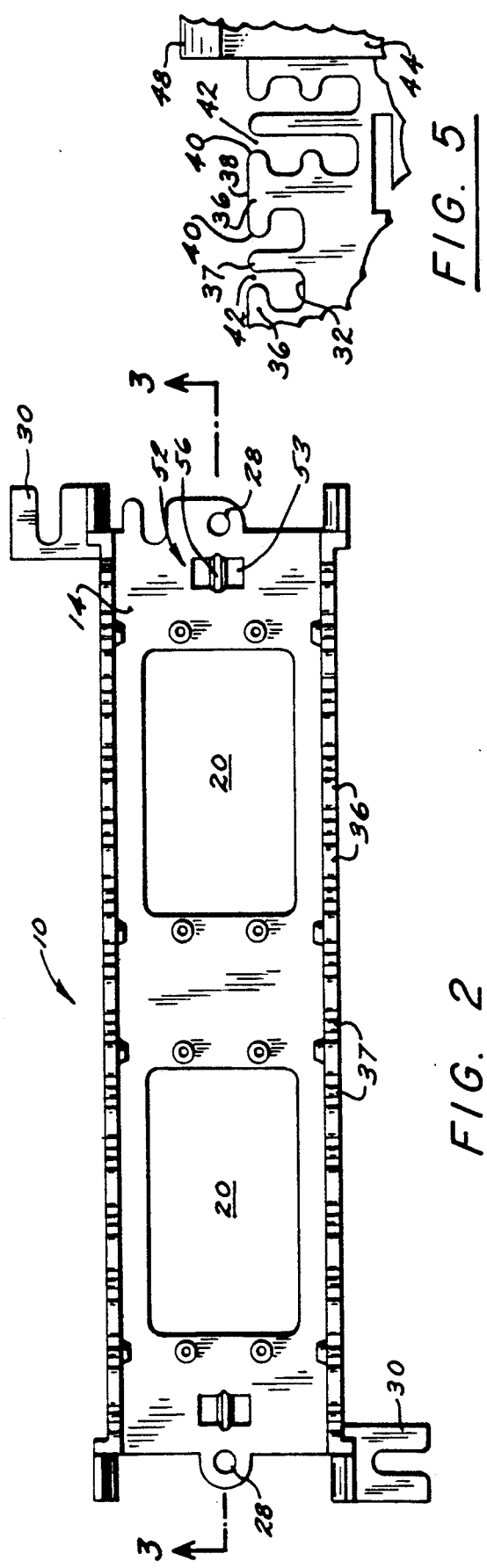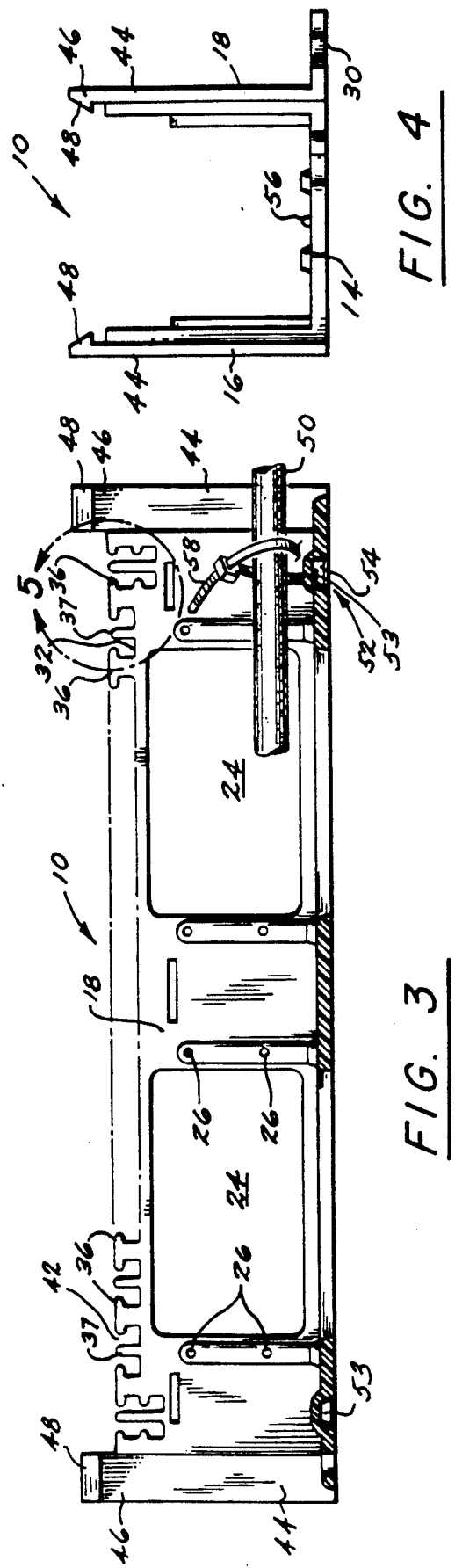

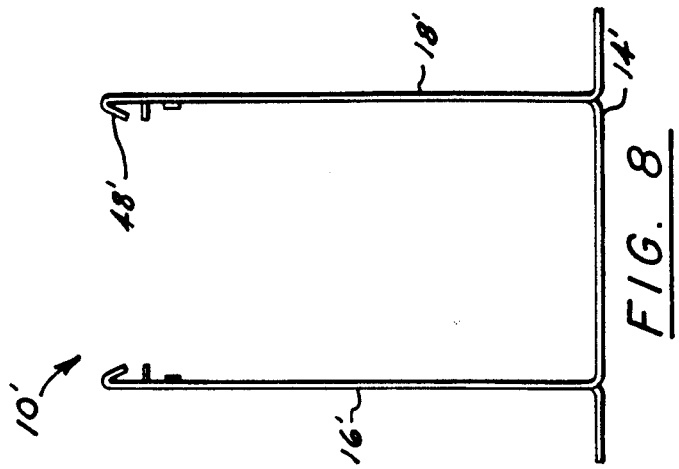
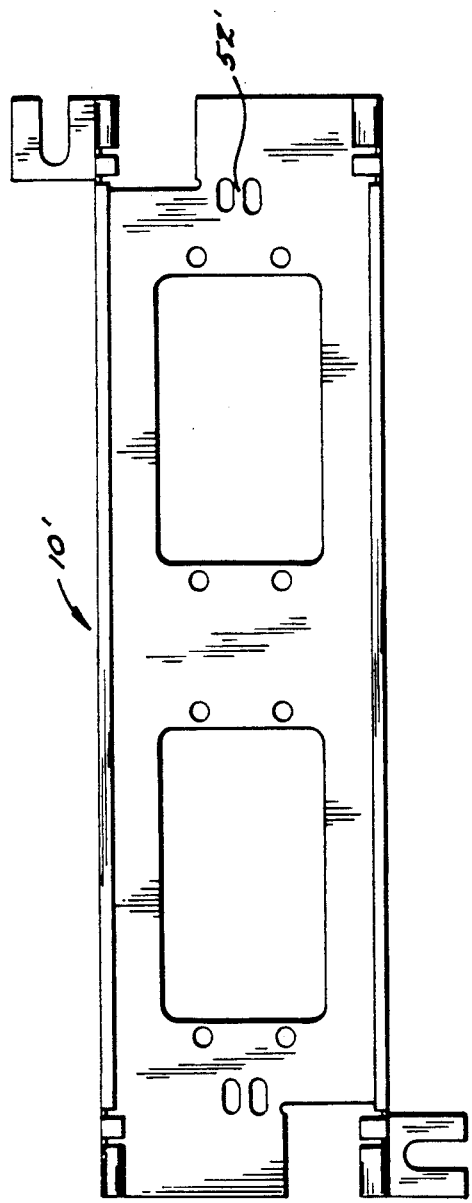
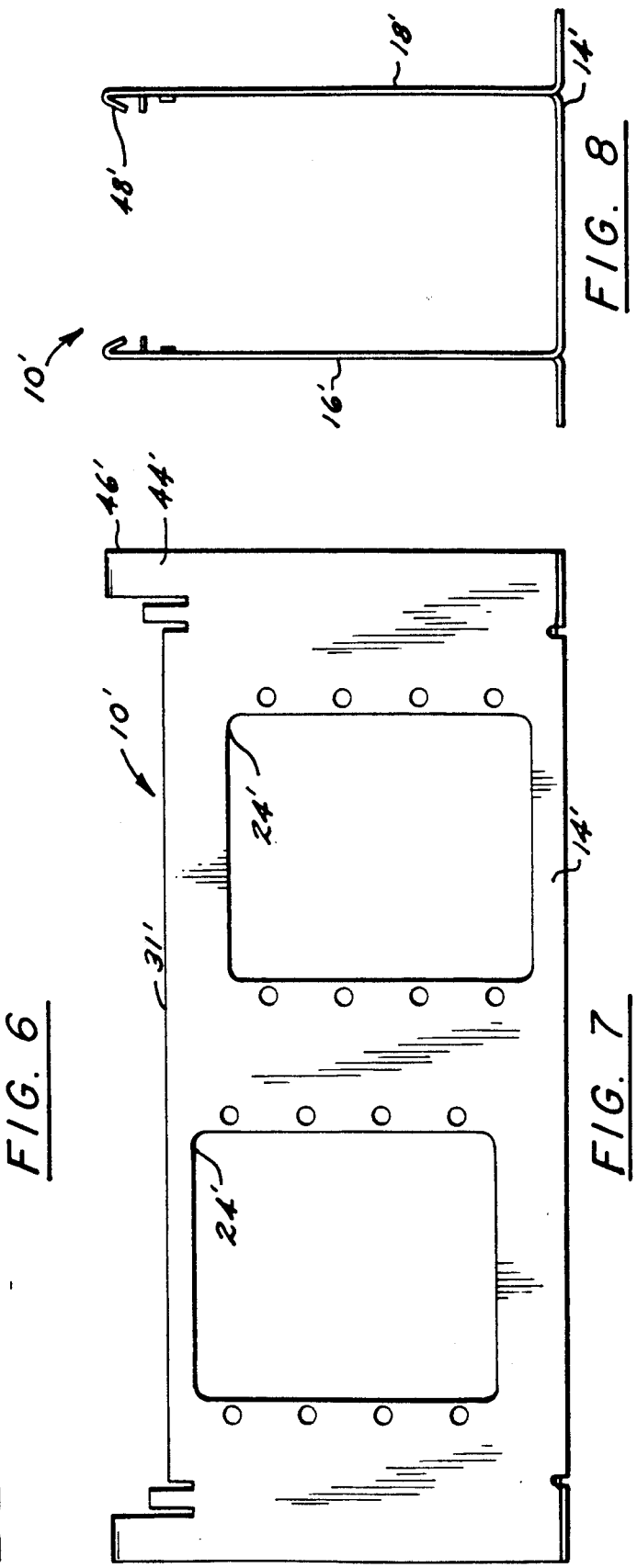

BRACKET FOR TERMINAL BLOCK

CROSS REFERENCE TO RELATED APPLICATION

This is a continuation-in-part of application Ser. No. 330,678 filed Mar. 30, 1989, now abandoned, which is a continuation-in-part of application Ser. No. 144,040 filed Jan. 15, 1988, now U.S. Pat. No. 4,824,403.

BACKGROUND OF THE INVENTION

This invention relates generally to the field of telephonic and related terminal block and bracket assemblies. More particularly, this invention relates to a new and improved bracket or cradle for use in conjunction with a connector block of the type used in data transmission lines, PBX installations and related telephonic and data interconnections.

Terminal block and bracket assemblies are well known. Large numbers of these terminal connecting block assemblies are used in the telephone and related industries (e.g., data transmission). Such terminal blocks must provide relatively permanent but changeable interconnections among a large number of electrically conductive wires extending to a junction zone in a building in order to provide telephone service and other data transmission functions to various locations throughout the building. A cable containing a large number of telephone line conductor pairs is terminated at a terminal connecting block and additional wires go out from there, for example, to a key telephone set.

Typically, telephone terminal blocks of the type described above are used in conjunction with a bracket or cradle to form a block and bracket assembly. In this construction, the block is usually wired on location in such a manner that it may thereafter be manually pressed into position upon a previously installed cradle. The cradle in turn is mounted upon a wall or other vertical supporting surface. Alternatively, the block and bracket assembly is pre-wired or pre-connectorized so that the pre-wired assembly can be directly installed at the installation location. Examples of such pre-wired terminal connecting block and bracket assemblies are disclosed in U.S. Pat. No. Reissue 31,714 which is assigned to one of the assignees hereof and incorporated herein by reference.

FIGS. 1 and 8 of U.S. Pat. No. Reissue 31,714 disclose two different wellknown types of brackets or cradles for use in block and bracket assemblies. While these prior art brackets are well suited for their intended purposes, there is a continuing need for improved cradles, particularly for use in conjunction with modern connector blocks used in PBX installations, data transmission lines and the like.

SUMMARY OF THE INVENTION

The present invention relates to anew and improved bracket or cradle for use in conjunction with terminal blocks for effecting connections in the telephonic, data transmission and related fields. In accordance with the present invention, the cradle comprises a generally rectangular bracket having a rear face an two opposed side faces transverse to the rear face. Each of the three faces include openings therein for receiving conventional male or female connector elements.

In accordance with an important feature of the present invention, the longitudinal upper surfaces of the opposed faces each includes a plurality of wire guide openings for positioning and retaining wires; and providing improved wire management to the bracket. Each wire guide opening is defined by a pair of spaced, alternating substantially T-shaped and longitudinal extensions which are positioned along the longitudinal upper surfaces to define an array of teeth.

Another important feature of the cradle of the present invention is the provision for cable tie down located on the rear surface of the bracket. This cable tie down feature permits a cable which is run through the bracket to be tightly secured subsequent to installation.

Still another important feature of the present invention is an improved snap-on attachment for effecting more reliable and secure attachment to a terminal block. This snap-on attachment is positioned along the upper surfaces of the opposed side faces.

The above-discussed features and advantages of the present invention will be appreciated and understood by those of ordinary skill in the art from the following detailed description and drawings:

BRIEF DESCRIPTION OF THE DRAWINGS

Referring now to the drawings wherein like elements are numbered alike in the several FIGURES:

FIG. 2 is a top plan view of the cradle of FIG. 1;

FIG. 3 is a cross-sectional elevation view along the line 3—3 of FIG. 2;

FIG. 4 is an end view of the cradle of FIG. 1;

FIG. 5 is an enlarged view of a portion of the wire guide openings found in the cradle of FIG. 1;

FIG. 6 is a top plan view of a second embodiment of a cradle in accordance with the present invention;

FIG. 7 is a side elevation view of the cradle of FIG. 6;

FIG. 8 is an end view of the cradle of FIG. 6;

DESCRIPTION OF THE PREFERRED EMBODIMENT

Figure 1:
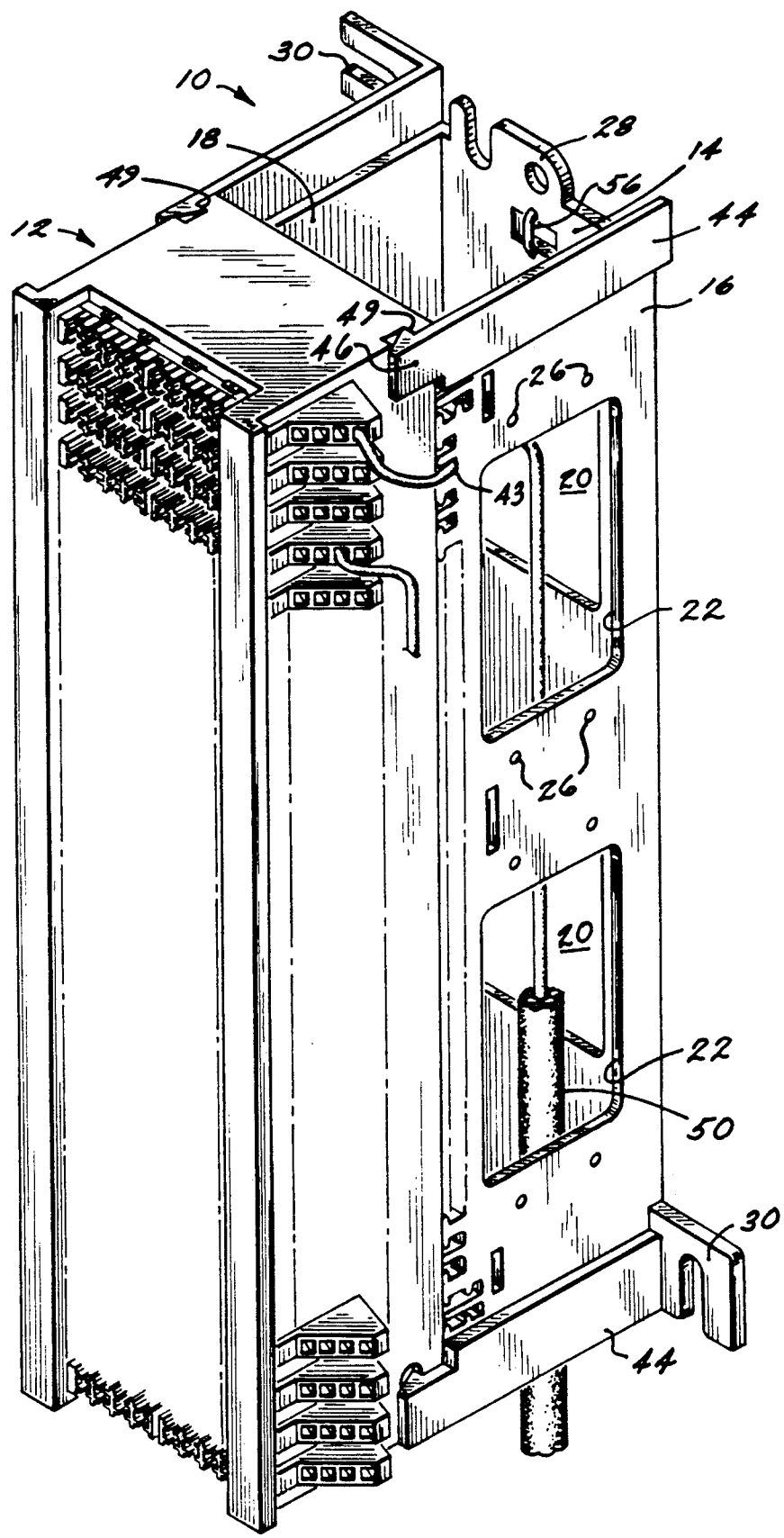
FIG. 1 is a perspective view of a first embodiment of the novel cradle of the present invention having a terminal block mounted thereon.

Referring jointly to FIGS. 1-5, a cradle or bracket in accordance with the present invention is shown generally at 10. It will be appreciated that in FIG. 1, a terminal block shown generally at 12 has been mounted on bracket 10. Bracket 10 is substantially rectangular in shape and is comprised of three walls or faces including rear wall 14 and a pair of opposed side walls or faces 16 and 18. Walls 16 and 18 are transverse to rear face 14. Thus, as shown in the FIGS., bracket 10 is generally open at the two opposed ends and the front face. Each of faces 14, 16 and 18 include a pair of spaced openings 20, 22 and 24, respectively, for receiving well known and conventional male or female connectors such as those depicted in similar openings found in the brackets disclosed in U.S. Pat. No. Reissue 31,714. In addition, two pairs of opposed screw holes 26 are positioned on either side of openings 20, 22 and 24 for receiving threaded fasteners and effecting attachment of the male or female connectors in a known manner. Rear face 14 of bracket 10 includes well-known mounting means for effecting attachment to a back plane or other flat surface. These mounting means include a pair of opposed semi-circular tabs 20 having mounting holes 28 therein. Tabs 20 are centrally located on either end of rear face 14. Additional open grooved mounting means 30 are provided which extend outwardly from diagonally opposed ends of rear surface 14. Bracket 10 is typically comprised of a suitable molded plastic material. It will be appreciated that all of the various structural features described thus far are well known and conventional to mounting brackets and cradles of the type contemplated by the present invention.

The important and novel features of the present invention include an array of spaced wire guide openings 32 found on each of the upper longitudinal surfaces 34 of bracket side walls 16 and 18. Each opening 32 is defined by a pair of opposed spaced members 36 and 37 which are aligned to define teeth. As shown in FIG. 5, member 36 is substantially T-shaped while member 37 is an upwardly extending or longitudinal member which provides resilient means for insertion and retension of the wire leads. Each T-shaped member 36 includes a flattened top 38 which terminates at opposed rounded ends 40. The small space 42 defined between extensions 36 and 37 are sized to permit a wire lead (see item 43 in FIG. 1) to be slightly deformed and passed therethrough. However, the spacing is small enough to make it difficult for the wire lead to be pulled out from opening 32 without some positive force.

The presence of wire guide openings 32 along the top longitudinal edges of side walls 16 and 18 provide an important feature to the present invention which is not found in prior art mounting brackets such as those disclosed in Reissue U.S. Pat. No. 31,714. In the prior art brackets, the upper longitudinal edges of the side walls are flush against the terminal block subsequent to mounting. While some large spaced openings are provided, no plurality of wire guide openings such as disclosed in the present invention are contemplated in these prior art brackets. The presence of wire guide openings in the present invention provides a marked improvement over the prior art since the plurality of wire guide openings permits improved wire management similar to that provided by well known fanning strips on a terminal block.

Still another important feature of the present invention is the improved resilient retaining members 44 which are provided at opposed ends of both sidewalls 16 and 18. Retaining members 44 extend upwardly and are an integral part of side walls 16 and 18. It will be appreciated that only the small upper section 46 and attached hook portion 48 of each retaining member 44 is not integral to sidewalls 16 or 18. This is in distinct contrast to prior art mounting brackets such as those shown in reissue U.S. Pat. No. 31,714 wherein the resilient retaining means are attached only at one small area in the bottom portion of the sidewalls and then extend upwardly along the entire width of the sidewalls as a separate, flexible member. Thus, in the prior art structure, assembly and disassembly between the bracket and terminal block will eventually weaken the attachment between the resilient members and the sidewalls to eventually break said attachment. In distinct contrast, the retaining members 44 of cradle 10 will not undergo this deleterious flexing because members 44 are attached along their entire length to sidewalls 16 and 18. Thus, when hook portion 48 on member 44 is mounted onto a corresponding shelf 49 on terminal block 12 as shown in FIG. 1, flexing will be distributed more evenly through the side walls 16 and 18, thus effecting a more even distribution of stress and a more robust means for attaching the connecting block 12 to the bracket 10. This feature also provides a means for improved manufacturability due to the alleviation of mechanical side cams in the plastic tooling that are required for moving prior art brackets. The incorporation of latching features integral to side walls 16 and 18 also results in a more cohesive shape which yields reduced molding process time.

Yet another important feature of the present invention is the presence of means for tying down cables. As shown in FIG. 1, block and bracket assemblies of this type are important for providing cable management. That is, cables such as identified at 50 FIG. 1 are often run through the interior of bracket 10 subsequent to a block 12 being mounted thereon. Unfortunately, cable 50 will often become loose and can interfere with internal features of the block and bracket assembly. This problem has been overcome in the present invention by cable tie down means identified generally at 52 of FIGS. 2 and 3. Cable tie down means 52 comprises a generally rectangularly shaped opening 54 and a central cross piece 56 which bridges opening 54. A pair of ramped surfaces 53 are defined by the rear wall at the respective opposite ends of opening 54, each of said ramped surfaces extending from its respective end of the opening toward the central cross-piece 56 and being rearwardly inclined. As shown in FIG. 3, a suitable tie structure 58 (such as a wire tie or a plastic tie) is provided through opening 54 around cross piece 56 and around cable 50. Tie 58 is then tightened to thereby secure cable 50 tightly to bracket 10. Similarly, a tie down structure 52 is preferably provided at the opposite end of the bracket so that a cable may be secured to the bracket in at least two places.

Turning now the FIGS. 6-8, a second embodiment of a bracket or cradle in accordance with the present invention is shown generally at 10'. Bracket 10' is preferably made of stamped metal and is preferably used in conjunction with pre-wired block and bracket assemblies. Bracket 10' includes both the tie down feature 52' and the resilient retaining member feature 44' discussed in detail with regard to the embodiment of FIGS. 1-5. The bracket shown in FIGS. 6-8 is used in a manner analogous to that of the bracket shown in FIGS. 1-4, i.e. a terminal block is supported on front surfaces 38' and retained in position by retaining members 44'.

The primary distinction between bracket 10' and bracket 10 is the difference in the wire guide means. In bracket 10', rather than having the plurality of wire guide openings 32 as in bracket 10, the entire upper longitudinal surfaces of sidewalls 16' and 18' are spaced backed from mounting members 44' so that upon assembly to a terminal block, a single or multiple at longitudinal spaces will be defined between longitudinal surfaces 31' and the terminal block.

Still another less important distinction between bracket 10' and bracket 10 is the presence of larger staggered cut out sections 24' in sidewalls 16' and 18' which permit the mounting of additional male or female connectors.

Figure 9:
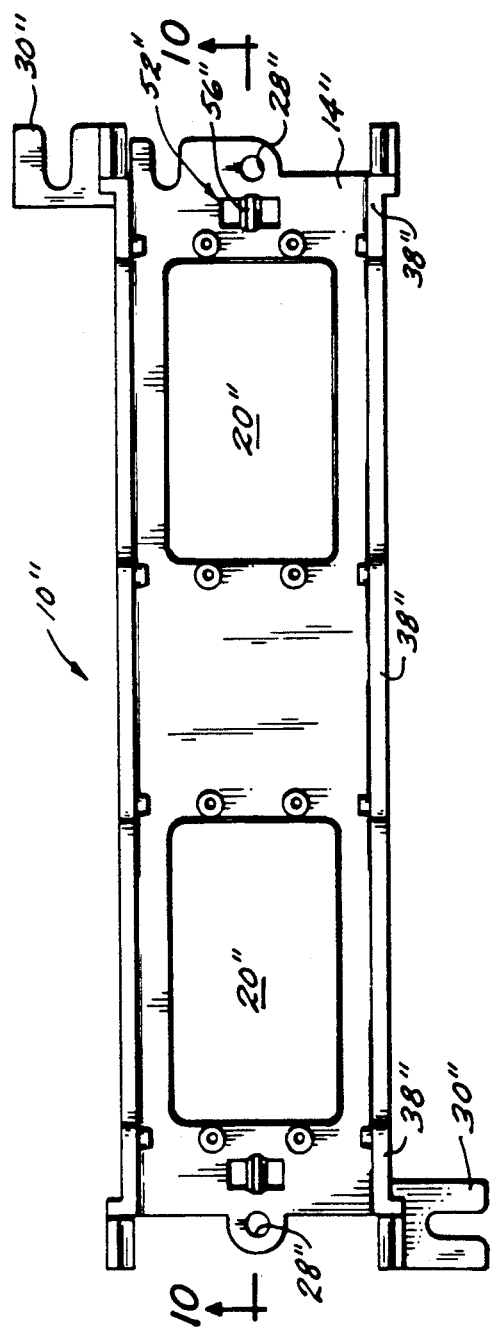
FIG. 9 is a top plan view of a third embodiment of a cradle in accordance with the present invention.
Figure 11:
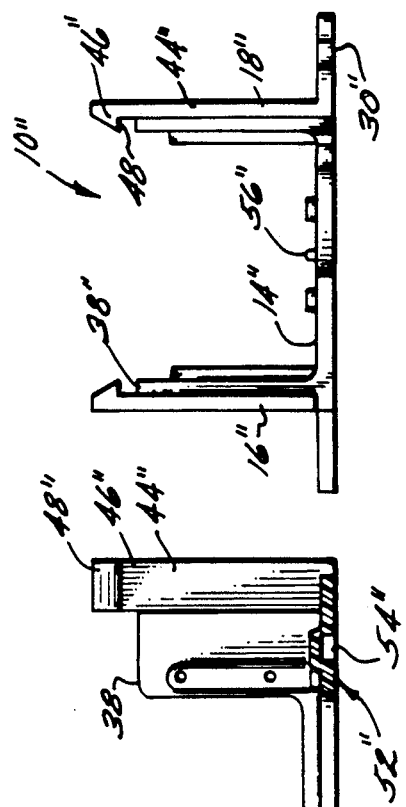
FIG. 11 is an end view of the cradle of FIG. 9.
Figure 10:
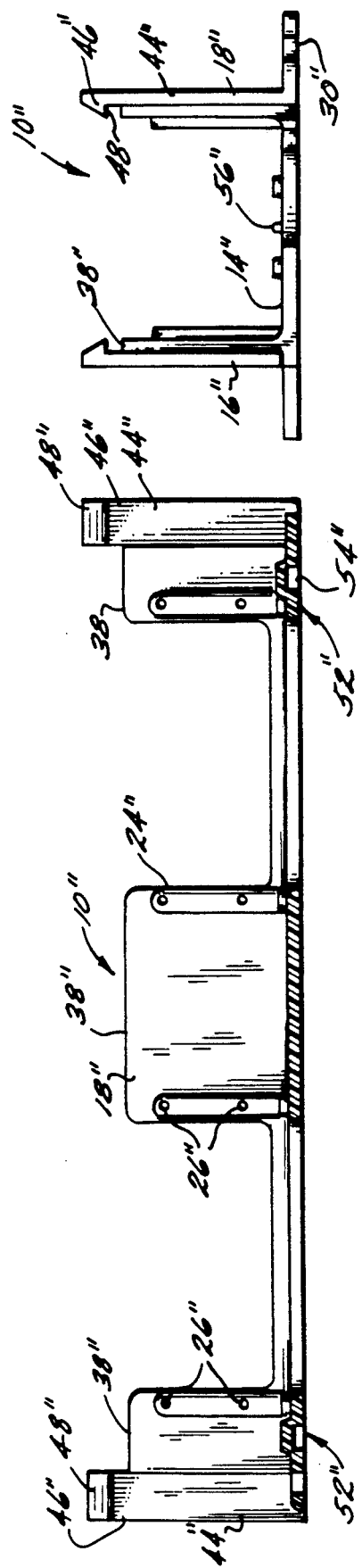
FIG. 10 is cross-sectional elevation view along the line 10—10 of FIG. 9.

Turning now to FIGS. 9-11, a third embodiment of a bracket or cradle in accordance with the present invention is shown generally at 10". Bracket 10" is substantially similar to bracket 10 of FIGS. 1-4 and is used in a manner analogous to bracket 10, i.e. a terminal block is supported on front surface 38' and retained in position by retaining means 44" with the exception that bracket 10" does not include the wire guide means of bracket 10 and the side openings 22" and 24" are open along the upper longitudinal edge of the bracket. Significantly, cradle 10" includes the important improvements and features of the previously described embodiments such as the integrally formed resilient retaining members 44" and the tie down structure 52".

It will be appreciated that the several brackets disclosed herein (particularly bracket 10" of FIGS. 9-11) may be used in conjunction with well known type 66 terminal blocks such as is shown in U.S. Pat. No. Re. 31,714.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A bracket for use with a terminal block, comprising:
    a pair of opposed side walls transverse to a rear wall; wherein each of said side walls comprises:
    a longitudinally extending front surface;
    a plurality of spaced apart wire guide openings along the front surface of at least one of the sidewalls;
    a block support portion, said block support portion extending longitudinally along the rear wall from a first transverse edge to a second transverse edge, extending forwardly from the rear wall to a front surface, and having an inner lateral surface; and
    a plurality of latch portions, each of said latch portions extending longitudinally from one of the transverse edges of the block support portion and integrally formed with a one edge, extending forwardly along the one edge from a rear surface to a front surface and having an inner lateral surface wherein said inner lateral surface of the latch portion is stepped laterally outwardly from the inner lateral surface of the support portion; and
    wherein the bracket further comprises:
    latch means, extending forwardly from the front surface of each of the latch portions of the wall, for securing the block against the front surface of the block support portion.

2. The bracket of claim 1 including:
    spaced openings in said opposed side walls for receiving unitary connectors; and
    apertures associated with said spaced openings for receiving fasteners for retaining unitary connectors in said openings.

3. A bracket for supporting a terminal block, comprising:
    a rear wall;
    a pair of opposed side walls, each of said side walls comprising:
    a block support portion, said block support portion extending longitudinally along the rear wall from a first transverse edge to a second transverse edge, extending forwardly from the rear wall to a front surface, and having an inner lateral surface; and
    a plurality of latch portions, each of said latch portions extending longitudinally from one of the transverse edges of the block support portion and integrally formed with the one edge, extending forwardly along the one edge from a rear surface to a front surface and having an inner lateral surface wherein said inner lateral surface of said latch portion is stepped laterally outwardly from the inner lateral surface of the support portion; and
    wherein the bracket further comprises:
    latch means, extending forwardly from the front surface of each of the latch portions of the wall, for securing the block against the front surface of the block support portion.

4. The bracket of claim 3 including:
    spaced openings in said opposed side walls for receiving unitary connectors; and
    apertures associated with said spaced openings for receiving fasteners from retaining unitary connectors in said openings.

5. The bracket of claim 4 wherein each of said side walls has an upper longitudinal edge and wherein:
    said spaced openings are open to said upper longitudinal edge.

6. The bracket of claim 3 wherein:
    said bracket comprises metal.

7. The bracket of claim 7 wherein the side walls each have an upper longitudinal edge, further including:
    a plurality of spaced wire guide openings along said upper longitudinal edge of at least one of said first and second side walls.

8. The bracket of claim 7 wherein:
    said wire guide openings are defined by a plurality of spaced members extending upwardly from said upper longitudinal edge.

9. The bracket of claim 8 wherein:
    at least some of said spaced members are T-shaped and some of said spaced members are longitudinal.

10. The bracket of claim 9 wherein:
    said T-shaped members alternate with said longitudinal members.

11. The bracket of claim 3, wherein the rear surface of the latch portion is free of the rear wall of the bracket.

12. The bracket of claim 3, wherein the outer lateral surface of the latch portion is stepped laterally outwardly from the outer lateral surface of the support portion.

13. The bracket of claim 3, wherein the inner lateral surface of the latch portion is substantially coplanar with the outer lateral surface of the support portion.

14. The bracket of claim 3, wherein the latch means comprises an inner lateral surface extending forwardly from the inner lateral surface of the latch portion of the wall for laterally positioning the block relative to the bracket.

15. The bracket of claim 14, wherein the front surface of the support portion lies within a first plane and wherein the latch means further comprises an engagement surface extending laterally inwardly from said inner lateral surface of said latch means and lying within a second plane, said second plane being oriented substantially parallel to and forwardly spaced apart from the first plane, for engaging the block to secure the block against the front surface of the support portion.

16. The bracket of claim 3, wherein each of the side walls includes a continuous inner surface, said continuous inner surface being formed by said inner lateral surface of said support portion, said transverse edges of said support portion and said inner lateral surfaces of said latch portions.

17. A bracket for supporting a terminal block, comprising:

a pair of opposed side walls transverse to a rear wall, wherein each of said side walls comprises:
   a block support portion, said block support portion extending longitudinally along the rear wall from a first transverse edge to a second transverse edge, extending forwardly from the rear wall to a front surface, and having inner and outer lateral surface; and
   a plurality of latch portions, each of said latch portions extending longitudinally from one of the transverse edges of the block support portion and integrally formed with the one edge, extending forwardly along the one edge from a rear surface to a front surface and having an inner lateral surface wherein said inner lateral surface of said latch portion is stepped laterally outwardly from the surface of the inner lateral surface of the support portion;
wherein the bracket further comprises:
latch means, extending forwardly from the front surface of each of the latch portions of the wall, for securing the block against the front surface of the block support portion;
at least one cable tie down means for securing a cable to the rear wall, said cable tie down means comprising:
a pair of openings in said rear wall;
a cross-piece bridging said opening, said cross-piece being forwardly spaced apart from said rear wall; and
tie means for passing through each of said openings and holding a cable to said cross-piece.

18. The bracket of claim 17 including:
spaced openings in said opposed side walls for receiving unitary connectors; and
apertures associated with said spaced openings for receiving fasteners for retaining unitary connectors in said openings.

19. The bracket of claim 22 wherein each of said side walls has an upper longitudinal edge and wherein:
said spaced openings are open to said upper longitudinal edge.

20. The bracket of claim 17 wherein:
said bracket is comprised of metal.

21. The bracket of claim 17 wherein the side walls each have an upper longitudinal edge, further including:
a plurality of spaced wire guide openings along said upper longitudinal edge of at least one of said first and second side walls.

22. The bracket of claim 21 wherein:
said wire guide openings are defined by a plurality of spaced members extending upwardly from said upper longitudinal edge.

23. The bracket of claim 22 wherein:
at least some of said spaced members are T-shaped and some of said spaced members are longitudinal.

24. The bracket of claim 23 wherein:
said T-shaped members alternate with said longitudinal members.

* * * * *

UNITED STATES PATENT AND TRADEMARK OFFICE
CERTIFICATE OF CORRECTION

PATENT NO. : 5,035,645

DATED : July 30, 1991

INVENTOR(S) : John Siemon and Paul V. De Luca

It is certified that error appears in the above-identified patent and that said Letters Patent is hereby corrected as shown below:

Abstract, line 3, change "transmisison" to --transmission--.

Col. 1, line 48,     Delete "wellknown" and insert therefore--well known--.

Col. 1, line 57     Delete "anew" and replace with --a new--.

Col. 1, line 62,     Delete "an" and replace with --and--.

Col. 3, line 20,     Delete "retension" and insert therefore--retention--.

Col. 4, line 37,     Delete "now" and insert therefore--to--.

Col. 5, line 4,     Between "edge" and "of" insert--38"--.

Col. 5, line 36,     Delete "a" and insert therefore--the--.

Col. 6, line 21,     Delete "7" and insert therefore--3--.

Col. 8, line 9,     Delete "22" and insert therefore--18--.

Signed and Sealed this

First Day of June, 1993

Attest:

MICHAEL K. KIRK

Attesting Officer     Acting Commissioner of Patents and Trademarks